US006849147B2

(12) United States Patent
Havard et al.

(10) Patent No.: US 6,849,147 B2
(45) Date of Patent: Feb. 1, 2005

(54) BEVERAGE LABEL AND METHOD OF MAKING SAME

(76) Inventors: Donald R. Havard, 352 Valverde Ave., Brea, CA (US) 92821; Jerry Foley, 6542 Fairlynn Blvd., Yorba Linda, CA (US) 92886; Robert E. Lonas, 330 Penn St. No. 6, El Segundo, CA (US) 90245

(*) Notice: Subject to any disclaimer, the term of this patent is extended or adjusted under 35 U.S.C. 154(b) by 80 days.

(21) Appl. No.: 10/434,773

(22) Filed: May 9, 2003

(65) Prior Publication Data

US 2004/0221944 A1 Nov. 11, 2004

(51) Int. Cl.[7] ......................... B32B 31/18; B32B 31/22; B32B 31/08; B41M 3/12; B42D 15/00

(52) U.S. Cl. ....................... 156/256; 156/230; 156/239; 156/247; 156/267; 156/277; 156/289; 428/40.1; 428/42.2; 428/195.1; 428/914; 283/81; 283/101

(58) Field of Search ................................ 156/230, 238, 156/239, 240, 249, 256, 267, 269, 277, 289, DIG. 28, DIG. 29, DIG. 30, DIG. 33; 428/40.1, 42.1, 42.2, 43, 195.1, 202, 914; 293/81, 101

(56) References Cited

U.S. PATENT DOCUMENTS 4,159,129 A * 6/1979 Lockhart ..................... 462/67
4,281,762 A * 8/1981 Hattemer .................... 206/390
4,479,838 A * 10/1984 Dunsirn et al. ............. 156/247
4,711,686 A 12/1987 Instance
4,726,972 A 2/1988 Instance
4,744,161 A 5/1988 Instance
4,747,618 A 5/1988 Instance
4,790,563 A 12/1988 Instance
4,850,613 A 7/1989 Instance
5,031,938 A 7/1991 Instance
5,174,605 A 12/1992 Instance
RE34,366 E 9/1993 Instance
5,262,214 A 11/1993 Instance
5,352,155 A * 10/1994 Fahey ......................... 462/25
5,399,403 A 3/1995 Instance
5,547,227 A * 8/1996 Laurash et al. ............... 283/81
5,593,749 A 1/1997 Instance
5,679,427 A 10/1997 Instance
5,686,159 A * 11/1997 Langan ...................... 428/40.1
5,700,537 A 12/1997 Instance (List continued on next page.)

*Primary Examiner*—J. A. Lorengo
(74) *Attorney, Agent, or Firm*—Stetina Brunda Garred & Brucker

(57) ABSTRACT

Disclosed is a container label comprising a base panel, a series of elongate perimeter tabs and a piggyback panel. The base panel has a base panel top surface coated with a release layer except for a series of elongate perimeter zones spaced along the base panel perimeter that are free of the release layer. The series of elongate perimeter tabs are sized complimentary to and are aligned with the perimeter zones. Each of the perimeter tabs defines a perimeter tab bottom surface coated with an adhesive layer such that the perimeter tabs are permanently bonded to the base panel. The piggyback panel is of a smaller size that the base panel. The piggyback panel has a piggyback panel bottom surface coated with the adhesive layer for releaseably bonding the piggyback panel to the base panel such that the piggyback panel may be peeled away from the base panel.

6 Claims, 4 Drawing Sheets

U.S. PATENT DOCUMENTS

| | | | | |
|---|---|---|---|---|
| 5,766,716 | A | | 6/1998 | Berry |
| 5,782,495 | A | | 7/1998 | Grosskopf |
| 5,804,271 | A | | 9/1998 | Berry |
| 5,863,628 | A | | 1/1999 | Berry |
| 5,944,357 | A | | 8/1999 | Instance |
| 5,958,536 | A | | 9/1999 | Gelsinger |
| 5,972,455 | A | | 10/1999 | Berry |
| 5,975,575 | A | | 11/1999 | Instance |
| 6,037,029 | A | | 3/2000 | Instance |
| 6,057,019 | A | | 5/2000 | Berry |
| 6,082,777 | A | | 7/2000 | Grosskopf |
| 6,120,637 | A | | 9/2000 | Berry |
| 6,254,138 | B1 | * | 7/2001 | Rawlings et al. ............. 283/81 |
| 6,491,995 | B1 | | 12/2002 | Schreiner |
| 6,531,024 | B1 | * | 3/2003 | Braun ........................ 156/277 |
| 6,576,315 | B2 | | 6/2003 | Treleaven et al. |

* cited by examiner

BEVERAGE LABEL AND METHOD OF MAKING SAME

STATEMENT RE: FEDERALLY SPONSORED RESEARCH/DEVELOPMENT (Not Applicable)

BACKGROUND OF THE INVENTION

The present invention relates to labels and, more particularly, to a uniquely configured container label having a piggyback panel. The container label is specifically configured for mounting on a container utilizing conventional labeling machinery.

In the prior art there exist container labels comprised of a base panel carrying a typically smaller piggyback panel. The piggyback panel is generally centered on the base panel within an interior region of the base panel. The piggyback panel is coated with an adhesive such as a pressure-sensitive adhesive allowing it to adhere to the base panel. The base panel is typically fabricated from paper stock that is permanently bonded on one side to a container such as a beer bottle. The opposite side of the base panel may be prepared so that it has a reduced amount of tackiness. For example, the opposite side of the base panel may be coated with a release layer such as silicone. The piggyback panel is mounted such that a portion of the marking indicia that is printed on the base panel is not visible unless the piggyback panel is peelably removed.

Because the base panel is coated with the release layer, the pressure-sensitive adhesive on the piggyback label has a reduced affinity for the base panel such that the piggyback panel is releaseably bonded to the base panel. In this configuration, the piggyback panel may be removed such that the marking indicia underneath the piggyback panel may be viewed. A consumer may purchase the container bearing such a container label and may peel back the piggyback panel from the larger base panel in order to reveal the marking indicia otherwise hidden by the piggyback label. The marking indicia may consist of text or graphics, or a combination thereof. The release layer on the base panel allows a user to repeatedly and alternately peelably remove and re-adhere the piggyback panel to the base panel. Container labels that are configured in such a manner include two layers of material in areas where the piggyback panel covers the base panel. However, remaining areas of the container label, such as the perimeter area, are comprised of only a single layer of material.

In automated labeling machinery, container labels are applied to containers in assembly line fashion at a high rate of speed. In certain types of labeling machinery, the container labels are mounted in a stacked formation within a stationery label magazine. The stack of container labels is held within the label magazine by guide fingers that are affixed to an end of the label magazine. The guide fingers are disposed around the perimeter of the foremost container label. A spring biases the stack of container labels against the guide fingers such that the foremost container label is advanced toward the end of the label magazine with the guide fingers preventing inadvertent dispensing of the container labels. A rotor comprised of multiple glue pallets is rotated past the label magazine. The foremost container label is held at its perimeter against the guide fingers until the glue pallet rotates past the container label, picking up the foremost container label in the magazine rack due to a coating of adhesive on the container label. The glue pallet then carries the container label past a moving conveyor of containers whereupon the container label is then transferred to the surface of one of the containers.

Ideally, the label magazine dispenses the container labels in singulated fashion such that only a single container label is transferred to each glue pallet as the glue pallet rotates past the label magazine. Container labels having a uniform thickness throughout permit the use of conventional labeling machinery wherein only a single container label is dispensed to each glue pallet. However, as was mentioned above, container labels carrying a piggyback panel have increased thickness where the piggyback label covers the base panel as compared to the thickness at the perimeter area. Due to this disparity in thickness, the biasing spring in the label magazine forces multiple container labels out of the label magazine each time a glue pallet passes the label magazine. The multiple dispensing of container labels leads to binding or jamming of the labeling machinery, mislabeling of the containers and a waste of unused container labels. Furthermore, the jamming may potentially cause damage to the labeling machinery and require that the labeling machinery be shut down, reducing production output.

BRIEF SUMMARY OF THE INVENTION

The present invention specifically addresses and alleviates the above referenced deficiencies associated with the use of container labels having piggyback panels. More specifically, the present invention allows for the use of container labels having piggyback panels in label magazines of conventional labeling machines by equalizing the container label thickness between the perimeter and the interior region such that container labels are dispensed from the label magazine in one-at-a-time fashion.

The container label comprises a base panel having a series of perimeter, tabs and a piggyback panel disposed thereupon. The perimeter tabs advantageously allow for the use of the container labels in a label magazine of a conventional labeling machine. The base panel material may be a paper material such as conventional paper stock. The base panel has a base panel top surface, a base panel bottom surface and a base panel perimeter. The base panel perimeter defines a first printed area of the base panel top surface adapted for printing marking indicia therewithin. The first printed area effectively encompasses the entirety of the base panel top surface. A majority of the base panel top surface is also coated with a release layer such as silicone. However, a series of elongate perimeter zones spaced along the base panel perimeter are free of the release layer. Such perimeter zones are also free of marking indicia. Importantly, the perimeter zones are generally spaced around the base panel perimeter so as to correspond to the placement and spacing of guide fingers of the label magazine such that the container labels are restrained at each of the perimeter tabs by a corresponding one of the guide fingers.

The series of perimeter tabs are sized complimentary to and are aligned with the perimeter zones. Each one of the perimeter tabs defines a perimeter tab bottom surface that is coated with an adhesive layer such as a pressure-sensitive adhesive. Because the perimeter zones are free of the release layer and marking indicia, the adhesive layer permanently bonds the base panel to the perimeter tab. Importantly, it is preferable that no less that two of the perimeter tabs are disposed on a side of the base panel perimeter such that the perimeter tabs correspond to the placement of the guide fingers of the label magazine from which the container labels may be dispensed.

The piggyback panel may be of a generally smaller size than the base panel perimeter. The piggyback panel has a piggyback panel bottom surface that is coated with the adhesive layer. However, because the base panel top surface is coated with the release layer, the adhesive layer on the piggyback panel bottom surface has a reduced affinity for the base panel such that the piggyback panel may be alternately peeled away and reapplied to the base panel. When the piggyback panel is partially peeled away from the base panel, an area of the base panel top surface that is otherwise hidden by the piggyback panel is exposed. The piggyback panel may also be reapplied to the base panel to cover up the area of the base panel.

Although the piggyback panel may have a circular shape with the base panel having an orthogonal shape, it is contemplated that there are many shapes that may be utilized for the piggyback panel and the base panel. However, the variety of configurations in which the base panel may be shaped is more limited as the shape of the base panel perimeter must be compatible with the cross-sectional shape of the label magazine of a labeling machine. The piggyback panel perimeter may include a peel tab protruding outwardly therefrom to aid in peeling the piggyback panel away from the base panel in order to expose graphics that may be hidden underneath the piggyback panel.

BRIEF DESCRIPTION OF THE DRAWINGS

These, as well as other features of the present invention will become more apparent upon reference to the drawings wherein.

DETAILED DESCRIPTION OF THE INVENTION

Figure 1:
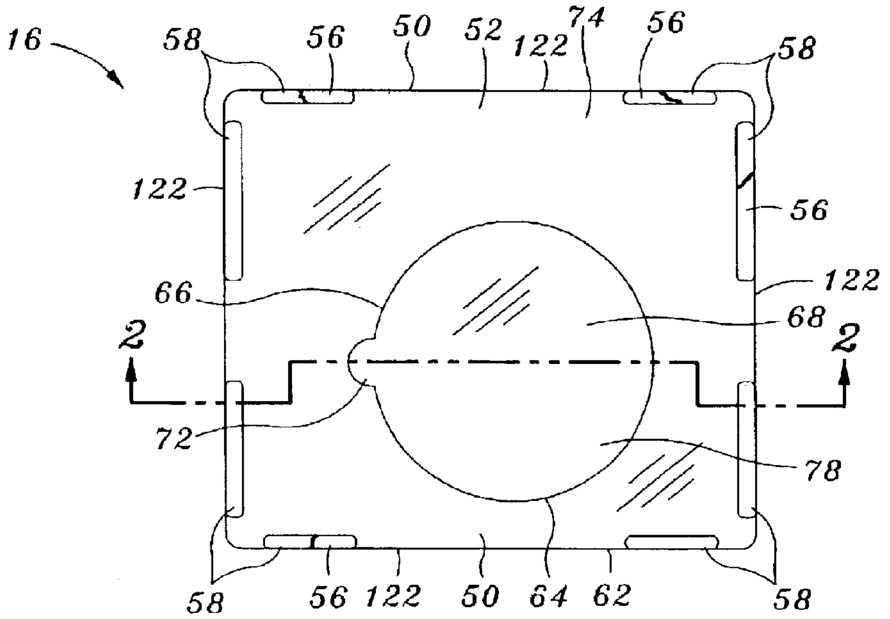
FIG. 1 is a plan view of a container label of the present invention illustrating a series of perimeter tabs and a piggyback panel disposed upon a base panel of the container label.
Figure 2:
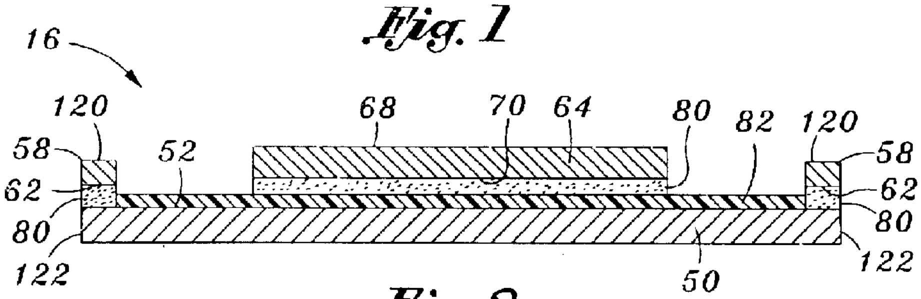
FIG. 2 is a cross-sectional view of the container label taken along line 2—2 of FIG. 1 illustrating the perimeter tabs permanently bonded to the base panel with an adhesive layer disposed therebetween and the piggyback panel releaseably bonded to the base panel with both a release layer and the adhesive layer disposed therebetween.

Referring now to the drawings wherein the showings are for purposes of illustrating the present invention and not for purposes of limiting the same, FIGS. 1 and 2 show the container label 16 comprising a series of perimeter tabs 58 and a piggyback panel 64 disposed upon a base panel 50. As will be shown, the perimeter tabs 58 advantageously allow for the use of the container labels 16 in a label magazine 38 of a labeling machine 10 of the type shown in FIG. 4. However, it should be noted that the container labels 16 of the present invention may be utilized in any number of labeling machines having alternative configurations other than shown in FIG. 4.

Figure 3:
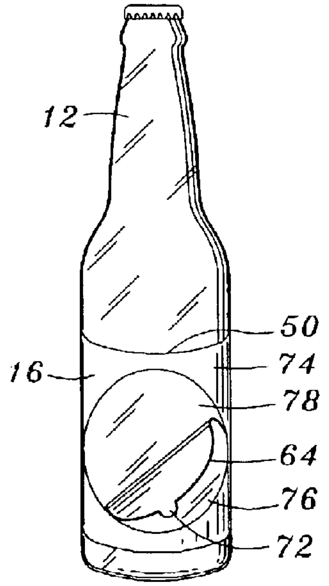
FIG. 3 is a perspective view of the container label as attached to a container and illustrating the piggyback panel as being partially peeled away from the base panel.

In the container label 16 shown in FIGS. 1 and 2, the base panel 50 material may be a paper material or a film material. A preferred material for the base panel 50 is conventional paper stock 86. As is shown in FIGS. 1 and 2, the base panel 50 has a base panel top surface 52, a base panel bottom surface 124 and a base panel perimeter 54. The base panel perimeter 54 defines a first printed area 74 of the base panel top surface 52 adapted for printing marking indicia therewithin, as seen in FIG. 3. The first printed area 74 effectively encompasses substantially an entire portion of the base panel top surface 52.

Figure 6:
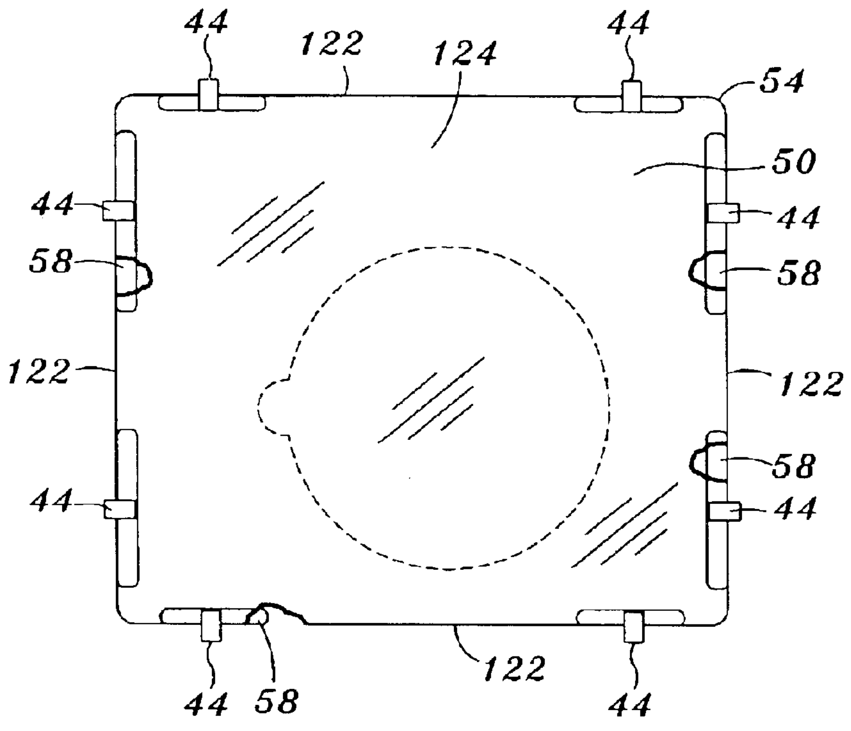
FIG. 6 is a side view of the label magazine taken along line 6—6 of FIG. 5 illustrating guide fingers of the label magazine bearing against the perimeter tabs that are disposed around a base panel perimeter of the container label.

A majority of the base panel top surface 52 is coated with a release layer 82 except for a series of elongate perimeter zones 56 spaced along the base panel perimeter 54 that are free of the release layer 82. Such perimeter zones 56 are also free of marking indicia. Importantly, the perimeter zones 56 are generally located around the base panel perimeter 54 corresponding to the placement of guide fingers 44 of the label magazine 38 as shown in FIG. 6. The release layer 82 may be a coating of a release compound such as silicone that is sprayed on the base panel top surface 52 excluding the areas defined by the perimeter zones 56.

Figure 4:
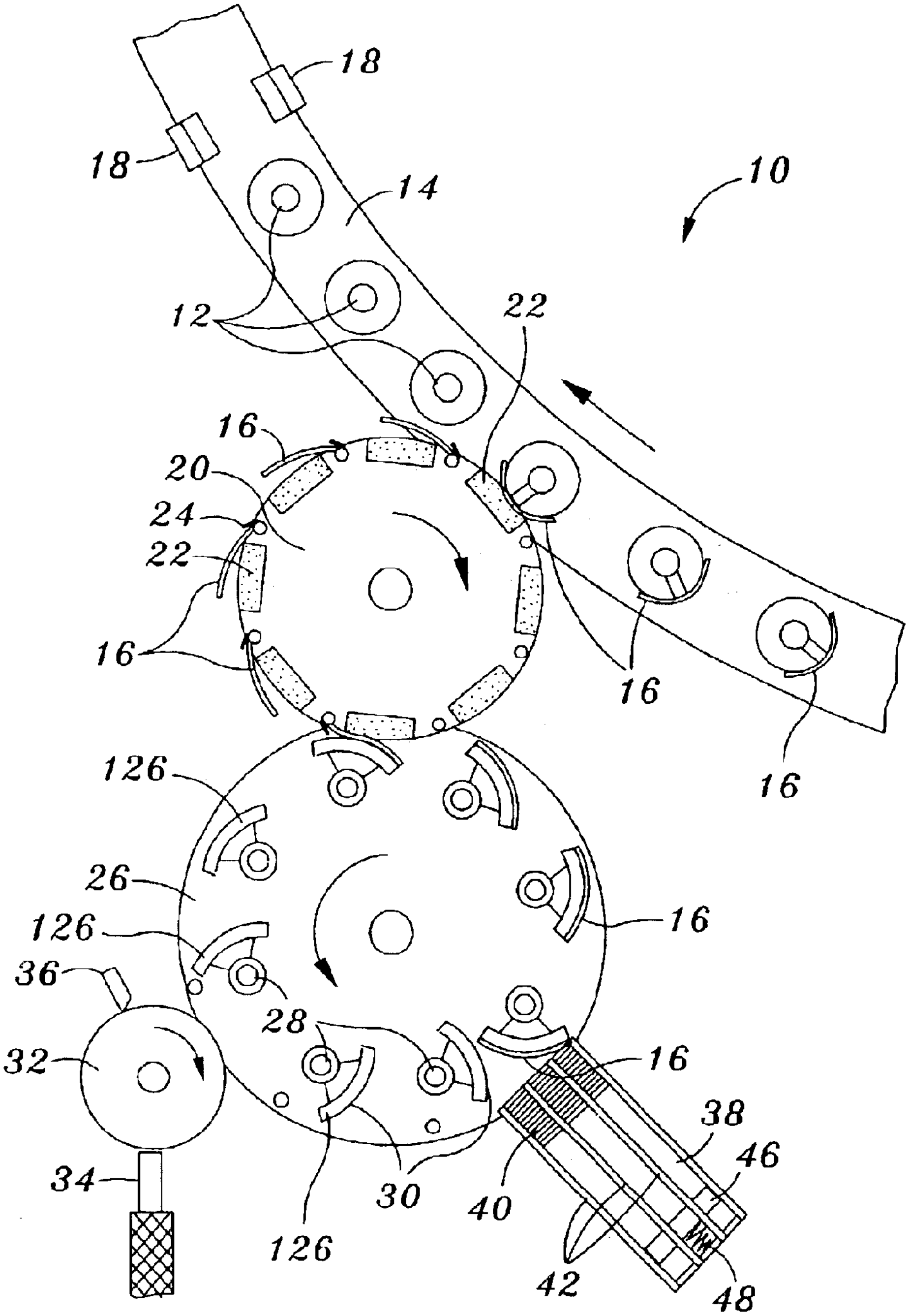
FIG. 4 is a top view of a labeling machine that may be utilized for applying container labels to containers.

The series of elongate perimeter tabs 58 are sized complimentary to and are aligned with the perimeter zones 56. As can be seen in FIGS. 1 and 4, the perimeter tabs 58 may have ends that are preferably rounded such that the perimeter tabs 58 may be cut cleanly through during a die cutting operation, as will be described in greater detail below. Because the perimeter tabs 58 are preferably shaped with rounded ends, the perimeter zones 56 may also be shaped with rounded ends complementary to the ends of the perimeter tabs 58. However, the ends of the perimeter tabs 58 and the ends of the perimeter zones 56 may have ends that are squared off or that have alternative shapes.

Each one of the perimeter tabs 58 defines a perimeter tab bottom surface 62 that is coated with an adhesive layer 80. Such adhesive layer 80 may be a pressure-sensitive adhesive. Because the area of the base panel top surface 52 excludes the release layer 82 in the perimeter zones 56, the adhesive layer 80 on the perimeter tab bottom surface 62 permanently bonds the base panel 50 to the perimeter tab 58. The series of elongate perimeter tabs 58 may be substantially identically shaped although it is contemplated that differently shaped perimeter tabs 58 may be utilized on a single one of the base panels 50.

The perimeter tabs 58 may be shaped and placed in a manner shown in FIGS. 1 and 2 although many other configurations for the shape and placement of the perimeter tabs 58 may be utilized. For example, the perimeter tabs 58 may be comprised of multiple perimeter tabs 58 that are of a shorter length than that shown in FIG. 1 but having approximately the same width. Importantly, it is preferable that no less that two of the perimeter tabs 58 are disposed along each side of the base panel perimeter 54 such that the perimeter tabs 58 correspond to the guide fingers 44 of the label magazine 38 from which the container labels 16 may be dispensed.

As shown in FIG. 2, the piggyback panel 64 may be sized to be smaller than the base panel perimeter 54 such that the piggyback panel 64 does not overlap the perimeter tabs 58.

The piggyback panel 64 has a piggyback panel bottom surface 70 that is coated with the adhesive layer 80. Because the base panel top surface 52 is coated with the release layer 82, the adhesive layer 80 on the piggyback panel bottom surface 70 has a reduced affinity for the base panel 50. In this regard, the piggyback panel 64 is releaseably bonded to the base panel 50 such that the piggyback panel 64 may be peeled away from the base panel 50.

An example of the application of the container label 16 can be seen in FIG. 3 which illustrates a beer bottle having the container label 16 mounted thereto. The piggyback panel 64 is shown as being partially peeled away from the base panel 50, exposing an area of the base panel top surface 52 that is otherwise hidden underneath the piggyback panel 64. The piggyback panel 64 may also be reapplied to the base panel 50 to cover up the area of the base panel 50 underneath the piggyback panel 64.

As is shown in FIGS. 1 and 2, the piggyback panel 64 has a piggyback panel top surface 68 and a piggyback panel perimeter 66 defining a second printed area 76 adapted for printing marking indicia therewithin on the piggyback panel top surface 68. As shown in FIG. 3, the first printed area 74 of the base panel top surface 52 includes a third printed area 78 that is adapted for printing marking indicia thereon. The marking indicia printed within the first printed area 74 may be different than the marking indicia printed in the third printed area 78. The third printed area 78 may be sized complementary to and aligned with the piggyback panel 64 such that the piggyback panel 64 may be peeled away from the base panel 50 to reveal any marking indicia that may be printed within the third printed area 78.

As can be seen in FIGS. 1 through 3, the piggyback panel perimeter 66 has a circular shape and the base panel 50 is substantially orthogonally or rectangularly shaped. Such an orthogonally shaped base panel 50 defines four base panel sides 122 thereof. A pair of the perimeter zones 56 and corresponding perimeter tabs 58 are spaced along and aligned with each one of the base panel sides 122 for a total of eight perimeter tabs 58 disposed on opposing ends of each of the base panel sides 122 in the configuration shown. However, as was earlier mentioned, the base panel perimeter 54 may define any number of shapes. Any number of perimeter tabs 58 may be disposed around the base panel perimeter 54. Although the container label 16 is shown with the piggyback panel 64 having a circular shape and the base panel 50 having an orthogonal shape, it is contemplated that there are many shapes that may be utilized for the piggyback panel 64 and the base panel 50. However, the variety of configurations in which the base panel 50 may be shaped is more limited as the base panel perimeter 54 must be compatible with label magazines 38 of conventional labeling machines similar to the labeling machine 10 shown in FIG. 4.

Referring to FIGS. 1 and 3, the piggyback panel perimeter 66 may include a peel tab 72 protruding outwardly therefrom. Such a peel tab 72 is configured to aid in peelably removing the piggyback panel 64 from the base panel 50 in order to expose marking indicia that may be printed on the third printed area 78 underneath the piggyback label. The peel tab 72 may also receive the adhesive layer 80 such that the peel tab 72 may be releaseably adhered to the base panel top surface 52 due to the release layer 82 on the base panel top surface 52 preventing permanent bonding of any portion of the piggyback panel 64 to the base panel 50.

Figure 7:
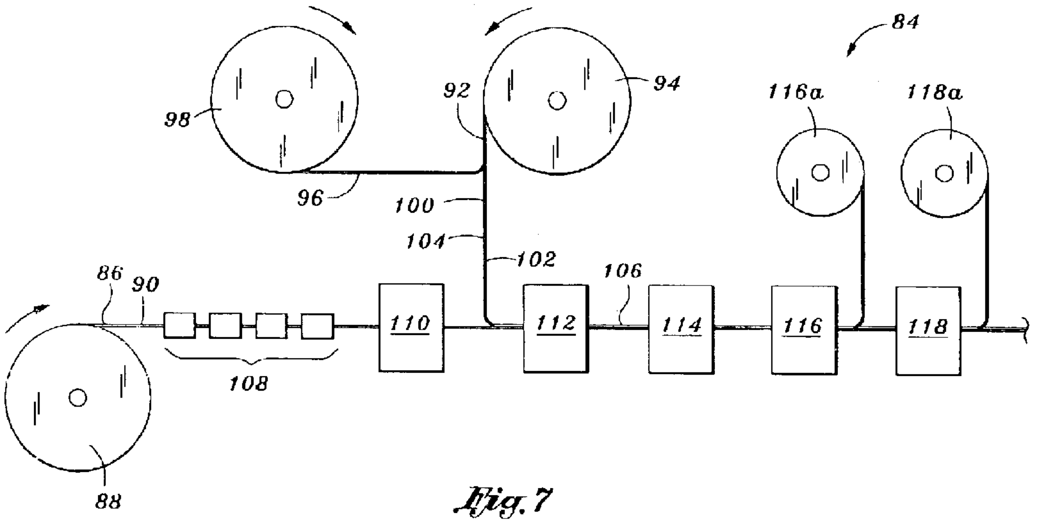
FIG. 7 is a schematic view of the process by which the container labels may be fabricated in accordance with an embodiment of the present invention.

Turning now to a discussion of the method of making the container labels 16 of the present invention, FIG. 7 shows a schematic view of a conventional label press 84 with which the container labels 16 may be fabricated. In the method for making the above-described container labels 16, a web of paper stock 86 is provided. The paper stock 86 has a paper stock top surface 90. The paper stock 86 may be wound on a paper stock roll 88 and fed to a paper stock print head 108 for printing marking indicia within the first printed area 74 and third printed area 78 on the paper stock top surface 90. The paper stock print head 108 may comprise only a single print head for printing two-color combinations such as black and white or blue and white color schemes. However, the paper stock print head 108 may comprise any number of print heads such that multiple colors may be applied to the paper stock top surface 90 within the first printed area 74 and the third printed area 78.

The paper stock 86 is then fed to a release layer print head 110 wherein the release layer 82 is applied to a substantial portion of the paper stock top surface 90 except within areas defined by the series of elongate perimeter zones 56 spaced along the base panel perimeter 54. The perimeter zones 56 are thus free of the release layer 82. Such perimeter zones 56 correspond to those described above and can be seen in FIGS. 1 and 2. The release layer print head 110 is configured to apply a coating of release layer 82 such as a silicone compound. The release layer print head 110 may be configured as a spot silicone print head, as is known in the art.

As is shown in FIG. 7, a web of conventional label stock 92 is provided such as from a label stock roll 94. The web of label stock 92 comprises two layers including a peel-off liner 96 and a substrate 100. The substrate 100 has a substrate top surface 102 and a substrate bottom surface 104. The substrate bottom surface 104 is coated with an adhesive that is secured to the peel-off liner 96. The adhesive may be a pressure-sensitive adhesive compound as was mentioned above. The peel-off liner 96 acts as a carrier for the substrate 100. The peel-off liner 96 also prevents the adhesive on the substrate bottom surface 104 from sticking to adjacent layers of substrate 100 on the label stock roll 94 during storage and handling. As the label stock 92 is wound off of the label stock roll 94, the peel-off liner 96 is peelably removed and wound onto a peel-off liner take-up roll 98 leaving only the substrate 100, as can be seen in FIG. 7.

After the peel-off 96 liner is removed, the substrate 100 is laminated onto the paper stock 86 such that the substrate bottom surface 104 contacts the paper stock top surface 90 to form a label assembly 106. Due to the coating of the release layer 82 on a substantial portion of the paper stock top surface 90, the pressure-sensitive adhesive on the substrate bottom surface 104 forms a releasable bond between the substrate 100 and the paper stock 86. However, in areas defined by the perimeter zones 56 that are free of the release layer 82, the pressure-sensitive adhesive on the substrate bottom surface 104 forms a permanent bond between the substrate 100 and the paper stock 86.

After the laminating step, the label assembly 106 is fed to a first substrate print head 112. Optionally, a second substrate print head 114 may be included in the label press 84. However, as in the paper stock print head 108, any number of substrate print heads may be included in the label press 84 depending on the variety of colors that are to be printed. The first substrate print head 112 and the second substrate print head 114 are utilized to print marking indicia within a second printed area 76 on the substrate top surface 102. The second printed area 76 can be seen in FIG. 3. The second printed area 76 generally corresponds to the area defined by the piggyback panel perimeter 66. However, in addition to the area defined by the piggyback panel perimeter 66, the second printed area 76 may additionally include the areas defined by the series of perimeter tabs 58.

The first and second substrate print heads 112, 114 may be configured to print marking indicia on the perimeter tabs 58 and the piggyback panel 64 in a manner similar to the marking indicia of the first printed area 74. In this manner, the appearance of the container label 16, as defined by the colors, text, and graphics thereof, may be aesthetically consistent between the base panel 50, the perimeter tabs 58 and the piggyback panel 64. As was earlier mentioned, the paper stock print head 108 is configured to print within the first printed area 74. The first printed area 74 generally corresponds to an area defined by the base panel perimeter 54 excluding the perimeter zones 56. The third printed area 78 may be disposed within the first printed area 74 and may be completely or partially hidden by the piggyback panel 64, as is shown in FIG. 3.

Referring still to FIG. 7, after leaving the first and second substrate print heads 112, 114, the label assembly 106 is fed to a first die cutter 116. The first die cutter 116 performs a type of cut known in the art as a "kiss cut" wherein the first die cutter 116 cuts through the substrate 100 leaving the underlying paper stock 86 untouched. During the kiss cut, the first die cutter 116 cuts the substrate 100 in order to form the piggyback panel 64, the series of elongate perimeter tabs 58 and a remainder label stock portion (not shown) of the substrate 100. Formed by the first die cutter 116, the piggyback panel 64 is cut so that it is sized complimentary to and is generally aligned with the second printed area 76. As was mentioned above, the piggyback panel 64 may have a circular shape as shown in FIGS. 1 and 3 although other shapes are contemplated. Furthermore, the piggyback panel 64 may be cut such that it includes the peel tab 72 protruding from the piggyback panel perimeter 66.

The first die cutter 116 also cuts the substrate 100 to form the series of elongate perimeter tabs 58 in a manner wherein the perimeter tabs 58 are sized complimentary to and are generally aligned with the perimeter zones 56. The substrate 100 may be cut such that the perimeter tabs 58 are located in a manner similar to that shown in FIGS. 1 and 2. However, it is contemplated that there are many alternate configurations for the perimeter tabs 58. For example, a single one of the perimeter tabs 58 may be comprised of multiple perimeter tabs 58 being of the same width as that shown in FIG. 1 but having a relatively short length.

Figure 5:
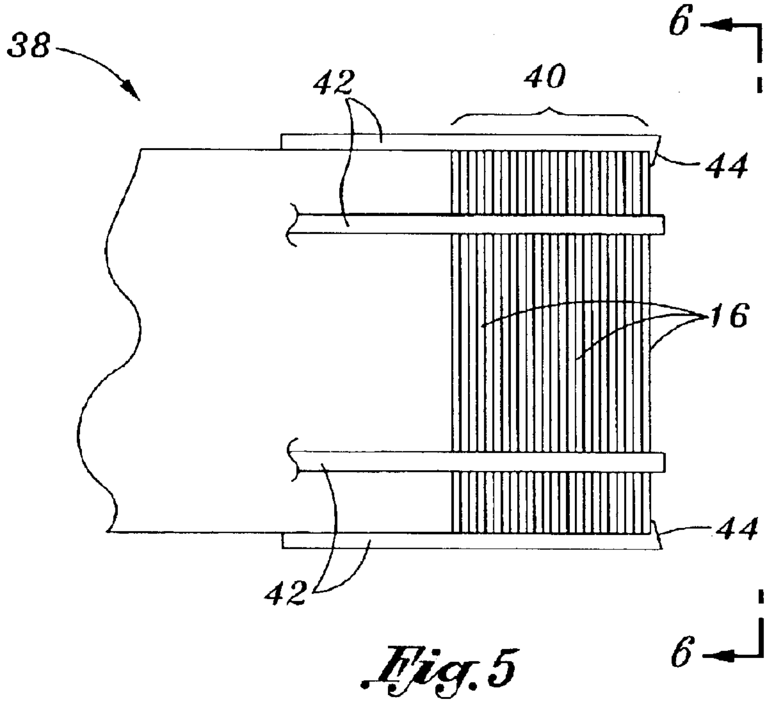
FIG. 5 is top view of a label magazine utilized in the labeling machine for dispensing the container labels therefrom.

Such perimeter tabs 58 of shorter length may be generally aligned with the perimeter zones 56 as shown in FIG. 1. However, preferably no less that two of the perimeter tabs 58 are disposed along each of the base panel sides 122 such that the perimeter tabs 58 generally correspond to the guide fingers 44 of the label magazine 38 from which they may be dispensed, as can be seen in FIGS. 5 and 6. As was mentioned earlier, the perimeter tabs 58 may have ends that are preferably rounded such that the perimeter tabs 58 may be cut cleanly through during the kiss cut.

After leaving the first die cutter 116, the label assembly 106 is fed to a remainder label stock removal station 116*a* as shown in FIG. 7. The remainder label stock removal station 116*a* is configured for removing or peeling the remainder label stock portion of the substrate 100 away from the paper stock top surface 90 leaving the piggyback panel 64 and the perimeter tabs 58 attached to the paper stock 86. As was mentioned earlier, due to the coating of the release layer 82 on the base panel top surface 52, the piggyback panel 64 is releaseably bonded to the paper stock 86 while the perimeter tabs 58 are permanently bonded to the paper stock 86. The remainder label stock removal station 116*a* may comprise a take-up roll, as is shown in FIG. 7, for collecting the remainder label stock portion for disposal.

After leaving the remainder label stock removal station 116*a*, the label assembly 106 is comprised of the web of paper stock 86 with portions of the substrate 100 being formed as repeating patterns of the piggyback panel 64 and the perimeter tabs 58. The label assembly 106 is then fed to a second die cutter 118 that cuts through the paper stock 86 in order to form the base panel 50, leaving a remainder paper stock portion (not shown). The base panel perimeter 54 defines the final shape of the container label 16. The substrate 100 is cut such that the base panel perimeter 54 encompasses the perimeter tabs 58 and the piggyback panel 64.

A remainder paper stock removal station 118*a* may be included in the label press 84, as can be seen in FIG. 7. The remainder paper stock removal station 118*a* is configured for removing or peeling the remainder paper stock portion away from the paper stock top surface 90 leaving the piggyback panel 64 and the perimeter tabs 58 attached to the paper stock 86. Like the remainder label stock removal station 116*a*, the remainder paper stock removal station 118*a* may comprise a take-up roll, as is shown in FIG. 7, for collecting the remainder paper stock portion for disposal.

As was indicated above, the first die cutter 114 may form the base panel 50 into a substantially orthogonal shape defining four base panel sides 122 thereof. Such an orthogonal shape of the base panel 50 may comprise a rectangular shape as is shown in FIGS. 1, 2 and 3. A succession of container labels 16 may be carried on a second liner (not shown) such that the container labels 16 may be wound on a container label roll (not shown). Alternatively, the second liner carrying the container labels 16 may be folded into a stack of singulated sheets. Regardless of the manner in which they are gathered after passing through the label press 84, the container labels 16 advantageously include the perimeter tabs 58 such that the container labels 16 may be applied to containers 12 utilizing a conventional labeling machine.

Turning now to FIG. 4, shown is a labeling machine 10 that is configured for automatically attaching the container labels 16 to containers 12 in rapid succession. The labeling machine 10 comprises a continuously rotating rotor 26 having a multiplicity of glue pallets 28 peripherally disposed thereon. The rotor 26 rotates in the direction indicated by the arrow. Additionally, each one of the glue pallets 28 is capable of rotating about its axis. A cam (not shown) within the rotor 26 is operative to oscillate the glue pallets 28 about their respective axes. Mounted upon each one of the glue pallets 28 is a remover element 126 having a partially cylindrically shaped arcuate face 30. Formed within each one of the arcuate faces 30 of the glue pallet 28 is a plurality of grooves (not shown).

Also shown in FIG. 4 is a glue roller 32 disposed adjacent the rotor 26 periphery. The glue roller 32 is configured to continuously rotate in the direction indicated by the arrow. The glue roller 32 receives glue or adhesive supplied by a glue nozzle 34 disposed at a periphery of the glue roller 32. A doctor blade 36, also disposed about the periphery of the glue roller 32, is configured to meter the amount of glue that is transferred from the glue roller 32 to each of the arcuate faces 30 of the remover elements 126 as the arcuate faces 30 rotate into contact with the glue roller 32.

The label magazine 38 is also shown in FIG. 4 as being disposed adjacent the rotor 26 periphery. The label magazine 38 is comprised of a plurality of parallel label guides 42 adapted for containing a stack 40 of the container labels 16 within the label magazine. As can be seen in FIG. 5, the stack 40 of container labels 16 are disposed within the label magazine 38 in back-to-back arrangement with the base panel bottom surface 124 of each of the container labels 16 being oriented to face the rotor 26, as is shown in FIG. 6. At an end of the label magazine 38 opposite that nearest the rotor 26 is a pusher 46 and a spring 48 that biases the pusher 46 towards the rotor 26. In this manner, the stack 40 of container labels 16 within the label magazine 38 is biased by the spring 48 towards the rotor 26.

As can be seen in FIGS. 5 and 6, the label magazine 38 includes the label guides 42. Each label guide 42 includes a series of guide fingers 44 disposed at an end thereof nearest the rotor 26. The guide fingers 44 are arranged and configured to restrain the foremost one of the container labels 16 against the biasing force of the spring 48. As can be seen, the foremost one of the container labels 16 is exposed at a removal opening of the label magazine 38 with the base panel bottom surface 124 facing the rotor 26. Upon rotating past the label magazine 38, each one of the glue pallets 28 is rotatably controlled such that the arcuate face 30, now coated with glue by the glue roller 32, comes into contact with the base panel bottom surface 124 of the foremost one of the container labels 16 in the stack 40. In this manner, the foremost one of the container labels 16 in the stack 40 will temporarily adhere to the glue-coated arcuate face 30 of the glue pallet 28.

As the rotor 26 continues to rotate past the label magazine 38, the adhesion between the glue and the base panel bottom surface 124 overcomes the restraining force of the guide fingers 44 upon the perimeter tabs 58, allowing for the gradual removal of the foremost one of the container labels 16 from the label magazine 38. Advantageously, the perimeter tabs 58 provide an additional layer of material such that the total thickness of the container label 16 in the area of the piggyback panel 64 is substantially equal to the total thickness in the areas of the perimeter tabs 58. This substantially equalized thickness allows the guide fingers 44 to restrain the container labels 16 against the biasing force of the spring 48 such that the dispersal of more than one container label 16 at a time is prevented. In this manner, only a single container label 16 is dispensed onto each of the glue pallets 28.

Referring still to FIG. 4, a gripper cylinder 20 having gripper fingers 24 and pressure pads 22 is disposed at the rotor 26 periphery. The gripper cylinder 20 is configured to continuously rotate in the direction indicated by the arrow. Upon passing the gripper cylinder 20, the remover elements 126 are operative to grip a container label 16 with the gripper fingers 24. The container label 16 is peeled off of the glue pallet 28 and held against the pressure pad 22 by the gripper fingers 24 as the gripper cylinder 20 rotates the container label 16 toward a container conveyor 14. As can be seen in FIG. 4, containers 12 are carried on the container conveyor 14 past the rotating gripper cylinder 20 in the direction of the arrow shown.

The container label 16 is then applied to a container 12 by intimate contact of the container 12 surfaces with the glue-coated base panel bottom surface 124 as the container 12 bears against the resilient pressures pad 22. Protruding edges of the container label 16 are then smoothed down into conformity with the container 12 by rollers or brushes 18 located downstream of the gripper cylinder 20 in the direction of movement of the container conveyor 14. After the adhesive layer 80 that is interposed between the base panel 50 to the container 12 has formed a permanent bond therebetween, the piggyback panel 64 may be partially peeled away from the base panel 50, exposing the third printed area 78 of the base panel top surface 52 that is otherwise hidden underneath the piggyback panel 64. The piggyback panel 64 may also be reapplied to the base panel 50 to cover up the third printed area 78.

As was earlier mentioned, the labeling machine 10 shown in FIG. 4 is only representative of one type of labeling machine that may be employed to apply the container labels 16 of the present invention. In this regard, it should be noted that any number of alternative labeling machines may be adapted for applying the container labels 16. Likewise, the label press 84 schematically shown in FIG. 7 is only representative of a process that may be utilized for fabricating the container labels 16 of the present invention. It is contemplated that there are alternative processes that may be utilized wherein additional steps are included in the process. Furthermore, some of the steps described above in fabricating the container labels 16 may be omitted. For example, the remainder paper stock removal station 118*a* may be omitted and performed at a later time.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of making a container label comprising the steps of:

providing a web of paper stock from a paper stock roll;

feeding the paper stock to at least one print head for printing marking indicia within a first printed area on a paper stock top surface;

applying a release layer to a paper stock top surface except within areas defined by a series of elongate perimeter zones spaced along a perimeter of the first printed area;

providing a web of label stock from a label stock roll, the web of label stock comprising a peel-off liner and a substrate having a substrate bottom surface coated with a pressure-sensitive adhesive and attached to the peel-off liner;

removing the peel-off liner from the label stock;

laminating the substrate onto the paper stock such that the substrate bottom surface contacts the paper stock top surface to form a label assembly;

feeding the label assembly to at least one print head for printing marking indicia within a second printed area on the substrate top surface, the second printed area being of smaller size than the first printed area;

cutting through the substrate to form a piggyback panel, a series of elongate perimeter tabs and a remainder portion, the piggyback panel being sized complimentary to and aligned with the second printed area, the series of elongate perimeter tabs being sized complimentary to and aligned with the elongate perimeter zones;

removing the remainder portion leaving the piggyback panel releaseably bonded to the base panel and the perimeter tabs permanently bonded to the base panel; and cutting through the paper stock to define a base panel encompassing the perimeter tabs and the piggyback panel.

2. The container label of claim 1 wherein:

the piggyback panel is formed into a circular shape;

the base panel is formed into a substantially orthogonal shape defining four base panel sides thereof;

the perimeter zones are formed such that a pair of the perimeter zones are spaced along and aligned with each one of the base panel sides.

3. The container label of claim 1 wherein the base panel is formed into a rectangular shape.

4. The container label of claim 1 wherein the piggyback panel is formed with a peel tab protruding outwardly from a piggyback panel perimeter, the peel tab being configured to aid in peelably removing the piggyback panel from the base panel.

5. The container label of claim 1 wherein the release layer is silicone.

6. The container label of claim 1 wherein the adhesive layer is a pressure-sensitive adhesive.

* * * * *